United States Patent [19]

Gray et al.

[11] 4,261,652

[45] Apr. 14, 1981

[54] LIQUID CRYSTAL COMPOUNDS AND MATERIALS AND DEVICES CONTAINING THEM

[75] Inventors: George W. Gray, Cottingham; Stephen M. Kelly, Hull; Damien G. McDonnell, Malvern; Alan Mosley, Reading, all of England

[73] Assignee: The Secretary of State for Defence in Her Britannic Majesty's Government of the United Kingdom of Great Britain and Northern Ireland, London, England

[21] Appl. No.: 62,623

[22] Filed: Aug. 1, 1979

[30] Foreign Application Priority Data

Aug. 4, 1978 [GB] United Kingdom ............... 32351/78

[51] Int. Cl.[3] .......................... G02F 1/13; C09K 3/34; C07C 69/76; C07C 69/74; C07C 121/46; C07C 121/62; C07C 121/64

[52] U.S. Cl. ................................ 350/350 R; 252/299; 252/408; 260/465 D; 560/102; 560/118; 350/346

[58] Field of Search ............................... 252/299, 408; 350/350 R, 346; 260/465 D; 560/102, 118

[56] References Cited

U.S. PATENT DOCUMENTS

| | | | |
|---|---|---|---|
| 3,876,286 | 4/1975 | Deutscher et al. | 252/299 |
| 4,002,670 | 1/1977 | Steinstrasser | 252/299 |
| 4,017,416 | 4/1977 | Inukai et al. | 252/299 |
| 4,058,478 | 11/1977 | Boller et al. | 252/299 |
| 4,065,489 | 12/1977 | Steinstrasser et al. | 252/299 |
| 4,112,239 | 9/1978 | DuBois et al. | 252/299 |
| 4,113,647 | 9/1978 | Coates et al. | 252/299 |
| 4,119,558 | 10/1978 | Coates et al. | 252/299 |
| 4,130,502 | 12/1978 | Eidenschink et al. | 252/299 |
| 4,149,413 | 4/1979 | Gray et al. | 252/299 |
| 4,154,697 | 5/1979 | Eidenschink et al. | 252/299 |

FOREIGN PATENT DOCUMENTS

| | | | |
|---|---|---|---|
| 2736424 | 2/1978 | Fed. Rep. of Germany | 252/299 |
| 2847601 | 5/1979 | Fed. Rep. of Germany | 252/299 |
| 2854310 | 6/1979 | Fed. Rep. of Germany | 252/299 |
| 2800553 | 7/1979 | Fed. Rep. of Germany | 252/299 |
| 105701 | 5/1974 | German Democratic Rep. | 252/299 |
| 132591 | 10/1978 | German Democratic Rep. | 252/299 |
| 2017742 | 10/1979 | United Kingdom | 252/299 |

OTHER PUBLICATIONS

Dewar, M. J. S., et al., J. Am. Chem. Soc., vol. 92, No. 6, pp. 1582–1586 (1970).

*Primary Examiner*—Teddy S. Gron

*Attorney, Agent, or Firm*—Stevens, Davis, Miller & Mosher

[57] ABSTRACT

A novel liquid crystal compound has the molecular structure:

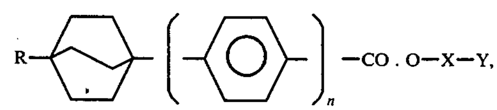

n = 0, 1 or 2.

where R is an alkyl group, which may contain up to 18 carbon atoms and which may be normal or branched and may contain a chiral center,

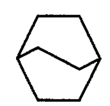

is a bicyclo (2.2.2) octane ring, —X— is and Y is a cyano group CN or $R^1$ or $OR^1$ where $R^1$ has the same definition as R.

The compound may be used in mixtures with other liquid crystal compounds in the same or other families and the compound or mixtures may be used in known liquid crystal devices, eg the twisted nematic and cholesteric-to-nematic phase change devices, depending on its properties.

35 Claims, 3 Drawing Figures

LIQUID CRYSTAL COMPOUNDS AND MATERIALS AND DEVICES CONTAINING THEM

The present invention relates to liquid crystal compounds and materials and devices containing them.

In the field of displays there is a requirement for electro-optic devices having a low power consumption. Devices incorporating liquid crystal materials have been shown to satisfy this requirement because they have an electrically switchable molecular arrangement and a very large electrical resistance, and at the present time a considerable amount of interest is being shown in such devices for these reasons.

There are many known liquid crystal materials; some have been known for many years. Liquid crystal materials are organic materials which exhibit a liquid crystal phase in which the molecules are arranged over limited spatial ranges in an ordered structure. The materials may be single compounds or mixtures of compounds.

According to the present invention there is provided a liquid crystal compound having the following molecular structure:

(I)

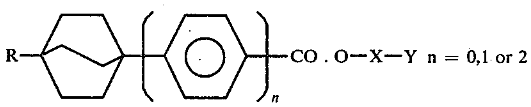

where R is an alkyl group,

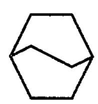

is a bicyclo (2.2.2) octane ring, is a 1,4 phenylene group 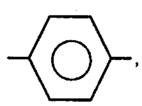, or a 4,4'biphenylyl group 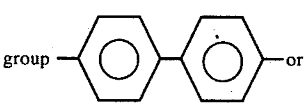 or a 2,6 naphthyl group 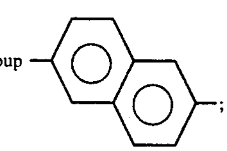;

Y is a cyano group or R' or OR' where R' has a definition the same as R.

A compound (or compounds) having molecular structure (I) will be referred to as a compound (or compounds) as defined.

The alkyl group R preferably contains less than eighteen carbon atoms, eg one to ten carbon atoms, and may be normal or branched. If R is branched it may contain a chiral centre in which case the compound is optically active.

If the compound has a terminal cyano group the dielectric anisotropy of the material will be positive otherwise the dielectric anisotropy is likely to be negative.

By a 'liquid crystal compound' is meant a compound in one of the following two known categories:

(i) Compounds which normally exhibit a liquid crystal phase;

(ii) Compounds which do not normally exhibit a liquid crystal phase but which nevertheless usefully affect some aspect of liquid crystal behaviour when dissolved in other liquid crystal compounds.

Compounds in category (ii) show a 'monotropic' or a 'virtual' liquid crystal to isotropic liquid transition at a temperature below the melting point of their solid phase. The monotropic or virtual transition may be detected respectively by rapid cooling of the liquid phase or by dissolving the compound in a material exhibiting a liquid crystal phase, observing the change in the transition to the isotropic liquid phase of the material by the addition and calculating the virtual transition temperature by extrapolation.

Compounds in category (ii) might for example be usefully dissolved in other liquid crystal compounds to extend or vary the liquid crystal temperature ranges of the compounds or to vary the molecular helical pitch (in the case of cholesteric liquid crystals).

Material which exhibits a liquid crystal phase and either consists of or contains a compound as defined above will be referred to herein as a material 'as defined'.

The liquid crystal phase exhibited by the material as defined may be nematic, smectic or cholesteric.

For a nematic phase the compound as defined should have a normal alkyl group R whilst for a cholesteric phase the compound as defined should have a branched alkyl group R containing a chiral centre.

Preferably compounds as defined are prepared from the intermediate bromocompound

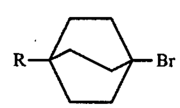

eg by the following routes:

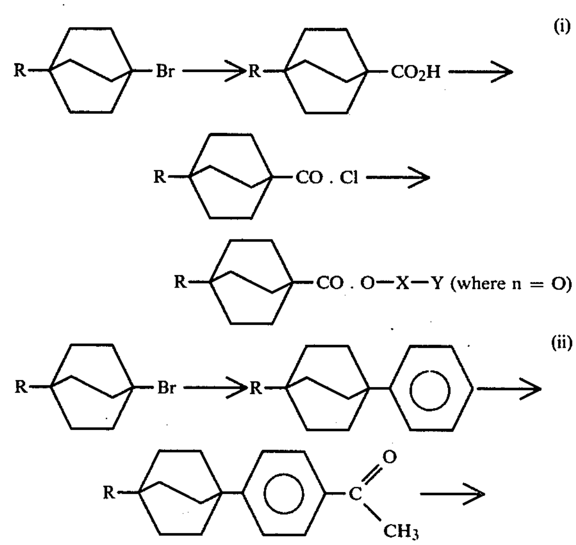

-continued

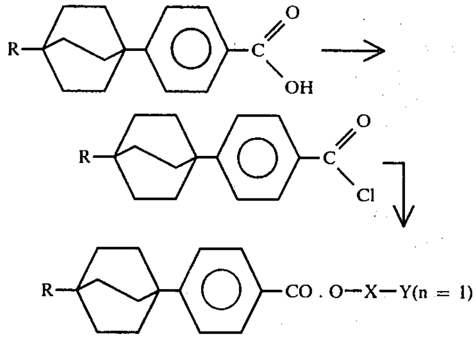

(iii)

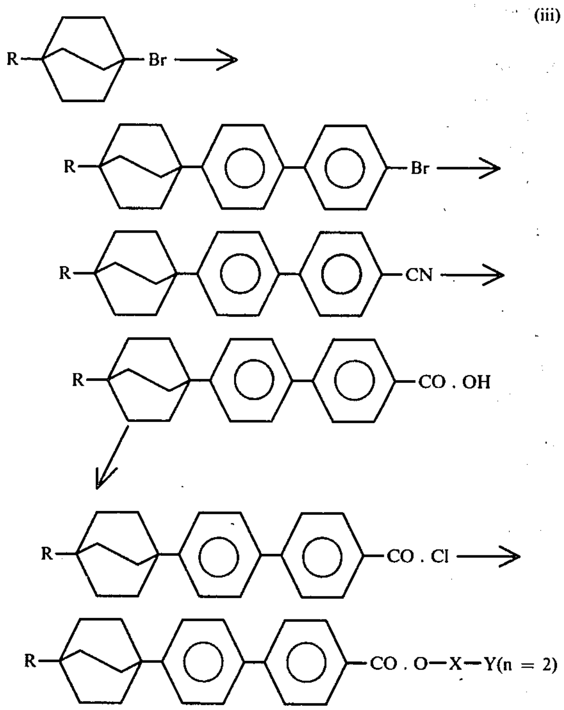

A compound as defined may be mixed with one or more other compounds as defined to enhance its liquid crystal properties, eg to extend its liquid crystal temperature range.

For example the following are examples of such mixtures:

(i)

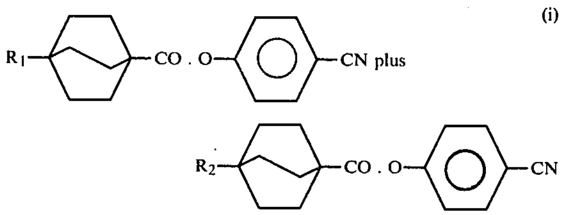

(ii)

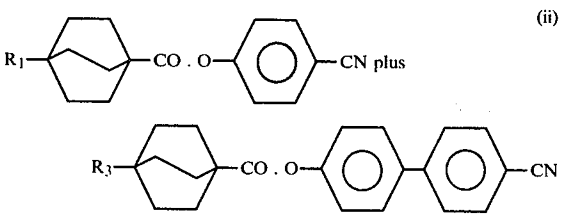

-continued (iii)

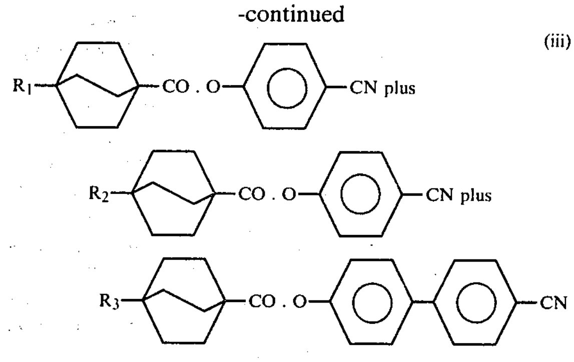

$R_1$, $R_2$, $R_3$=alkyl containing less than 10 carbon atoms $R_1 \neq R_2$.

Likewise, compounds as defined may be mixed with one or more of the compounds in the following categories:

(i)

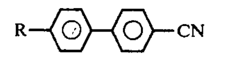

(ii)

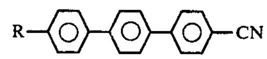

(iii)

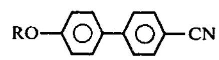

(iv)

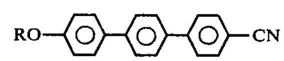

(v)

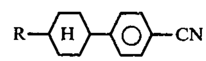

(vi)

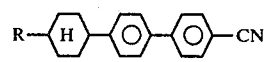

(vii)

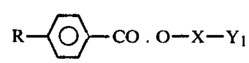

(viii)

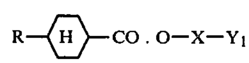

(ix)

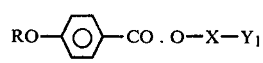

(x)

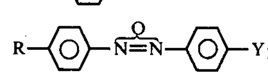

(xi)

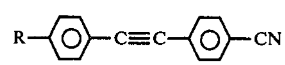

(xii)

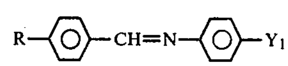

(xiii)

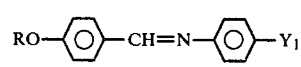

(xiv)

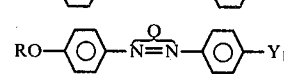

(xv)

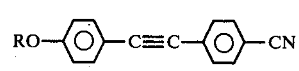

(xvi)

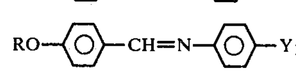

(xv)

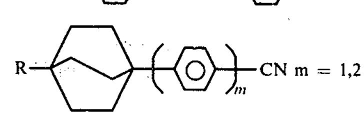

where R is defined as above,

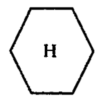

is a cyclohexane ring, X is as defined above, and $Y_1$ is CN, $R^1$, $OR^1$ or $COO\text{-}X\text{-}Y^1$ where $Y^1$ is CN, $R^1$ or $OR^1$; the definition of $R^1$ is the same as that of R.

According to another aspect of the present invention a liquid crystal device includes means for containing a region of liquid crystal material, a region of liquid crystal material contained in the containing means, wherein the liquid crystal material is material as defined above and means for applying an external stimulus to the material to alter the molecular arrangement in the material.

The means for applying an external stimulus may for example be means for applying an electric field to the region.

The change in molecular arrangement produced by the external stimulus may be used to affect the transmission of electromagnetic radiation at any wavelength of interest through the material, for example, by changing the transmissivity of the material or by changing the helical order of the material, if it is optically active.

According to another aspect of the invention, an electro-optic liquid crystal device includes two adjacent plates at least one of which is optically transparent, a layer of liquid crystal material contained in the space between the plates wherein the liquid crystal material is the material as defined above, and deposited on the inner facing surfaces of the plates, a film of conducting material to allow an electric field to be applied across the layer. The electro-optic device may for example by a display device used, for instance, in an instrument such as a time watch or clock. The device may for example be of the known 'twisted nematic' or (cholesteric-to-nematic) 'phase change' types.

Examples of methods of preparing compounds as defined will now be described.

EXAMPLE 1

The intermediate compound 1-bromo-4-alkyl substituted bicyclo [2.2.2] octane which is used in the preparations described below may be prepared by the following route:

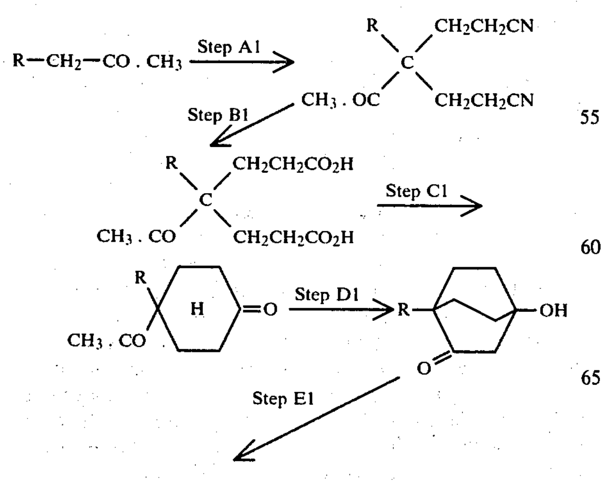

-continued

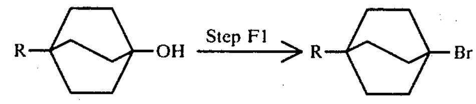

R as defined above

STEP A1: The production of 3-acetyl-1,5-dicyano-3 substituted pentane.

STEP B1: The production of 3-acetyl-3-substituted pentane-1,5-dicarboxylic acid.

STEP C1: The production of 4-acetyl-4-substituted cyclohexanone.

STEP D1: The production of 1-hydroxy-4-substituted bicyclo [2.2.2] octan-3one.

STEP E1: The production of 1-hydroxy-4-substitued bicyclo [2.2.2] octane.

STEP F1: The production of 1-bromo-4-substituted-bicyclo [2.2.2] octane.

All six of these steps may be carried out by methods essentially analogous to those for R=methyl and ethyl described by H D Holtz and L M Stock in the Preparation of 1 Carboxy-4-Substituted Bicyclo [2.2.29 Octanes, J. Am. Chem. Soc, 86, 5183 (1964).

EXAMPLE 2

The production of ester derivatives of 1-carboxy-4 alkyl substituted bicyclo [2.2.2] octane by the following route:

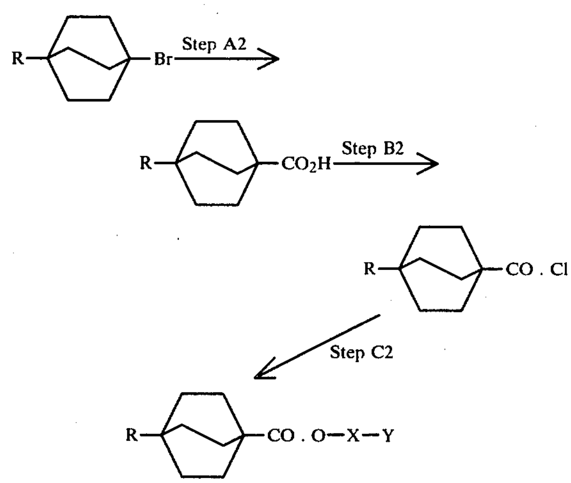

R as defined above

STEP A2:

1-carboxy-4-substituted-bicyclo [2.2.2] octane may be prepared from 1-bromo-4-substituted bicyclo [2.2.2] octane prepared in Example 1, by a modification of the reaction described for R=methyl and ethyl in the paper mentioned above by H D Holtz and L M Stock, J. Am. Chem. Soc, 86, 5183 (1964).

STEP B2: The production of 4-substituted 1-bicyclo [2.2.2] octanoyl chloride.

A solution of 1-carboxy-4-substituted bicyclo [2.2.2] octane (0.0018 mole) in dry toluene (10 $cm^3$) is heated under reflux with thionyl chloride (1 $cm^3$) for one hour under anhydrous conditions and then allowed to cool. The mixture is evaporated to dryness under vacuum and then more dry toluene (10 $cm^3$) is added and the resultant solution is again evaporated to dryness under vacuum. The acid chloride residue is used in the next step C2 without further purification.

STEP C2:

Ester derivatives of 1-carboxy-4-substituted bicyclo [2.2.2] octane may be prepared by a suitable modification of the reaction described for the preparation of 1,4-bicyclo [2.2.2] octylene di-4-methoxybicyclo [2.2.2] octane-1-carboxylate by M J S Dewar and R S Goldberg in a paper on The Role of p-Phenylene Groups in Nematic Liquid crystals, J. Am. Chem. Soc, 92, 1582 (1970) using the acid chloride prepared in step B2.

Three examples of products of Step C2 are:

-continued

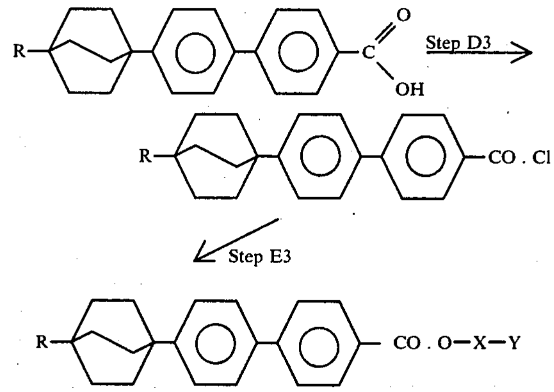

(1)

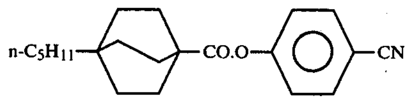

Crystal (C) to nematic (N) transition temperature = 89.0° C.
Nematic to isotropic liquid transition temperature = 108.8° C.

(2)

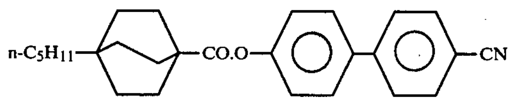

Crystal (C) to nematic (N) transition temperature = 139.2° C.
Nematic to isotropic liquid transition temperature = 271.1° C.

(3)

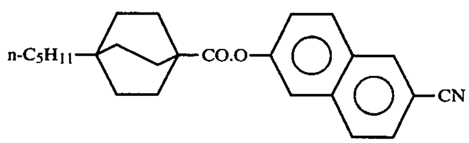

C-N transition temperature = 106.1° C.
N-I transition temperature = 202.8° C.

(1) is 4-cyanophenyl 4-n-pentylbicyclo [2.2.2] octane-1-carboxylate.
(2) is 4-cyano-4'-biphenyl 4-n-pentylbicyclo [2.2.2] octane-1-carboxylate.
(3) is 2-cyano-6-naphthyl-4-n-pentylbicyclo [2.2.2] octane-1-carboxylate.

Further examples:

(i)

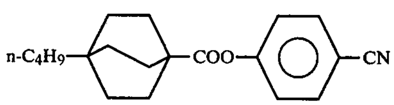

C-I = 99° C. N-I (virtual transition) = 96° C.

(ii)

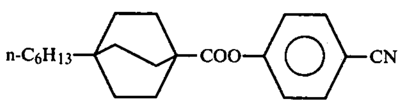

N-I = 102° C. C-N = 77° C. See also below.

EXAMPLE 3

The preparation of compounds having the structure

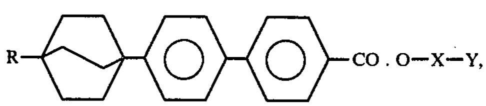

as defined above, by the following route:

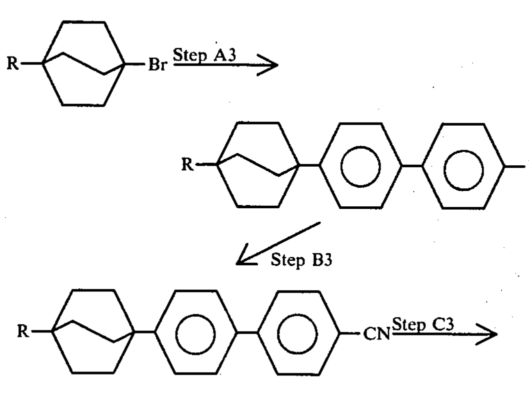

R as defined above

STEP A3: The production of 1-(4'-bromo-4"-biphenylyl)-4-substituted bicyclo [2.2.2] octane.

A solution of 1-bromo-4-substituted bicyclo [2.2.2] octane (0.0039 mole) in dry nitrobenzene (15 $cm^3$) is added dropwise over a period of thirty minutes to a well stirred solution of crushed anhydrous aluminium chloride (0.0016 mole) and 4-bromobiphenyl (0.0116 mole) in dry nitrobenzene (25 $cm^3$) maintained at 80° C. under anhydrous conditions. The mixture is kept at this temperature for five hours. It is then left stirring at room temperature, eg overnight. It is then added to a small amount of a hydrochloric acid/ice/water mixture and stirred for about twenty minutes. The organic layer is separated off and steam distilled to remove the solvent and 4-bromobenzene. The residue is dissolved in toluene and the solution so formed is dried over magnesium sulphate. It is then filtered and evaporated to dryness under vacuum. The solid residue is crystallised from ethanol and toluene. When R=pentyl, the product of this step has C—N=192.0° C. and N—I=231.2° C.

STEP B3: The production of 1-(4'-cyano-4''-biphenylyl)-4-substituted bicyclo [2.2.2] octane.

A solution of 1-(4'-bromo-4''-biphenylyl)-4-substituted bicyclo [2.2.2] octane (0.0019 mole) in dry 1-methyl-2-pyrrolidinone (5 $cm^3$) is heated at 180° C. with anhydrous copper (I) cyanide (0.0039mole) for two hours under anhydrous conditions. The mixture is allowed to cool and then added to a solution of anhydrous iron (III) chloride (0.35 g) in water (5 $cm^3$) with concentrated hydrochloric acid (0.5 $cm^3$). This is stirred for twenty minutes at 50° C. and then water is added (50 $cm^3$). This mixture is extracted several times with ether and then the combined organic layers are dried over magnesium sulphate. The solution is filtered and evaporated to dryness under vacuum. The product is purified by column chromatography using silica-gel with a chloroform/hexane mixture as eluent. It is finally crystallised from 2-methoxy-ethanol.

An example of such a product is:

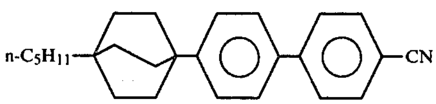

C—N = 159.7° C.
N—I = 269.3° C.

STEP C3: This Step is a hydrolysis of a kind well known in standard organic acid preparations.

STEP D3: This Step is similar to Step B2 described above.

STEP E3: The Step is similar to Step C2 described above.

EXAMPLE 4

The preparation of compounds having the structure

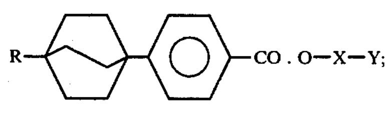

as defined above, by the following route:

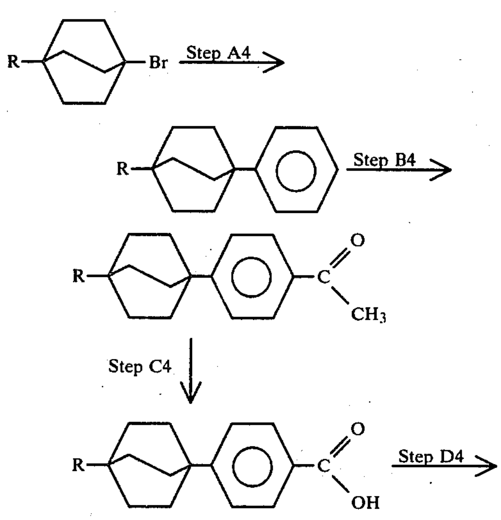

-continued

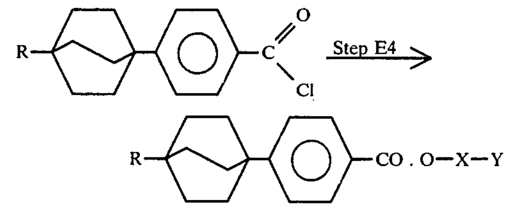

STEP A4:

The production of 4-substituted-1-phenylbicyclo [2.2.2] octane may be carried out by a reaction which is analogous to that described by S Sotheeswara, PhD Thesis, Hull University Library 1967. When R=pentyl the product of this step has M.P.=37° C.

STEP B4: The production of 4'-(4-substituted 1-bicylco [2.2.2] octyl)acetophenone.

A solution of acetyl chloride (0.0077 mole) in dry nitrobenzene (3 $cm^3$) is added dropwise to a well stirred solution of 4-substituted 1-phenylbicyclo [2.2.2] octane (0.007 mole) and crushed anhydrous aluminium chloride (0.0082 mole) in dry nitrobenzene (7 $cm^3$) at 0° C. This solution is left stirring, eg overnight, at room temperature. It is then added to a small amount of a hydrochloric acid/ice/water mixture and stirred for 30 minutes. The organic layer is separated off and steam distilled. The solid residue is taken up in chloroform and the resultant solution dried over magnesium sulphate. It is then filtered and evaporated to dryness under vacuum to give a solid. This is crystallised from a methanol/ethanol mixture. When R=pentyl the product of this step has M.P.=81° C.

STEP C4: The production of 4'-(4-substituted 1-bicyclo [2.2.2] octyl) benzoic acid.

A solution of sodium hypobromite, prepared by dissolving bromine (0.0168 mole) in a solution of sodium hydroxide (0.0570 mole) in water (15 $cm^3$) at 0° C., is added to a well stirred solution of 4'-(4-substituted 1-bicyclo [2.2.2] octyl) acetophenone, prepared in step B4, in dioxan (15 $cm^3$). Throughout the addition and for thirty minutes afterwards the temperature is maintained at 35°–40° C. The excess of sodium hypobromite is destroyed by adding a solution of sodium metabisulphite in water. More water is added and bromoform distilled from the reaction mixture. On cooling, the solution is acidified with concentrated hydrochloric acid and the precipitated product filtered off and washed with water.

The product was crystallised from a methanol/ethanol mixture. When R=pentyl the product of this step has C—N=226.7° C.; N—I=288.7° C.

STEP D4: The production of 4'-(4-substituted 1-bicyclo [2.2.2] octyl) benzoylchloride.

A solution of 4'-(4-substituted-1-bicyclo [2.2.2] octyl) benzoic acid prepared in Step C4 (0.0017 mole) in dry toluene (10 $cm^3$) is heated under reflux with thionyl chloride (1 $cm^3$) for one hour under anhydrous conditions and then allowed to cool. The mixture is evaporated to dryness and then more dry toluene (10 $cm^3$) is added. The resultant solution is again evaporated to dryness under vacuum. The acid chloride residue is used in the step E4 without further purification.

STEP E4: This Step is similar to Step C2 described above.

A liquid crystal device embodying the invention will now be described by way of example only with reference to the accompanying drawings of which:

Figure 1:
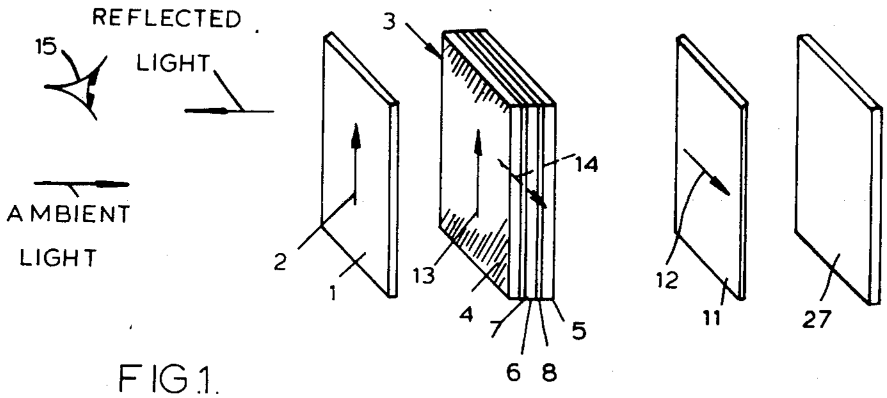
FIG. 1 is an exploded view of a twisted nematic display.

As shown in FIG. 1 a liquid crystal display of the 'twisted nematic' type includes a polariser 1 arranged with its polarisation axis 2 vertical. A liquid crystal cell 3 comprises two glass slides 4, 5 containing a layer of liquid crystal 6 which is basically a nematic material but may contain a small proportion (eg 1%) of a cholesteric compound. Electrodes 7, 8 eg of tin oxide are arranged on the inner faces of the slides 4, 5. Behind the cell 3 is an analyser or second polariser 11 arranged with its polarisation axis 12 horizontal. A brushed aluminium reflector 27 is behind the analyser 11.

Prior to assembling the cell the slides 4, 5 are coated on their inner faces with silicon monoxide or magnesium fluoride. This coating is formed by evaporating a stream of eg silicon monoxide onto the slide at an angle of about 5° to the surface as for example described in UK Patent Specification No. 1,454,296. On assembly the slides are arranged with the evaporation direction on the two slides 4, 5 at 90° to one another. With such a coating liquid crystal molecules at the coated surface lie in a single direction (parallel to the evaporation direction) and at an angle of about 25° to 35° typically about 30° to the slide surface. As a result the liquid crystal molecules progressively twist from one slide 4 to the other slide 5. Thus the plane of plane polarised light is rotated through 90° on passing through the cell 3 providing the direction 13 of the molecules at the surface of the slide 4, 5 is parallel (or perpendicular) to the polarisers axis 2, 12 respectively. Thus when zero voltage is applied to the cell light passes through the analyser 1, cell 3 and analyser 11, and is then reflected back to an observer 15.

When a suitable voltage is applied between the electrodes 7, 8 the molecules between the electrodes are caused to align parallel to the applied field and light transmitted by the polariser is transmitted without rotation to the analyser 11. Since the polariser and analyser 11 are crossed no light is transmitted to the reflector and no light is reflected back to the observer at those parts of the cell 3 between electrodes 7, 8 which therefore appear dark on a lighter background. Thus by shaping each electrode 7, 8 into say seven discrete parts separately connectable to a voltage source the number 0 to 9 may be displayed.

Figure 3:
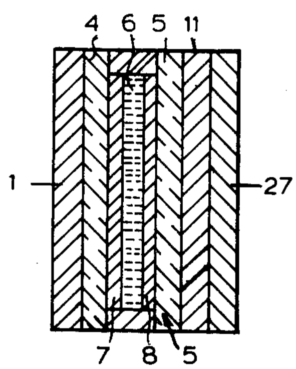
FIG. 3 is a sectional view of the display part of the watch in FIG. 2 but drawn to an enlarged scale.
Figure 2:
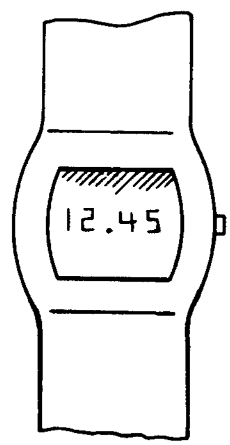
FIG. 2 is a front view of a watch having a twisted nematic liquid crystal display constructed as shown in FIG. 1.

In the watch display of FIGS. 2, 3 the electrodes 7, 8 are arranged to provide four seven bar numeric characters plus a period dot which may be arranged to pulse once per second.

The voltage required to align the molecules parallel to the applied field, is the 'ON' state, is dependent on layer 6 thickness, materials used, temperature and surface treatment of the slides 4, 5. A typical thickness of layer is 12 μm. The material used must be stable over the temperatures of use ie ambient temperatures which can be assumed constant for comparison purposes. A surface treatment ie evaporation of silicon monoxide at 5° giving large tilt eg 30° of molecules reduces the voltage necessary to turn the cell 'ON' at the expense of a degraded contrast or speed.

In typical watch displays using twisted nematic liquid crystal displays a 1.5 volt battery is used to drive the oscillator and logic circuits of the watch and an up converter is used to raise the voltage to 3.0 volts for operating the display.

An example of material embodying the invention suitable for use as the liquid crystal 6 is:

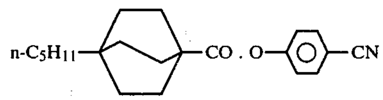
10% by weight

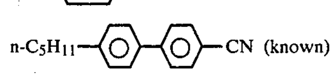
(known) 89% by weight,

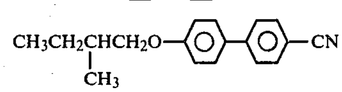
(known) 1% by weight

Liquid crystal compounds and mixtures embodying the invention may also be used in known phase change effect devices in which an optically active material is normally mixed with a nematic material to give a long helical Pitch cholesteric material which may be switched to a nematic state by the action of an electric field applied in a way similar to that described above in relation to the twisted nematic device. An example of a phase change effect device is described in UK Pat. No. 1,433,130. The compounds or mixtures embodying the invention may comprise either the nematic material (if R is n-alkyl) or the optically material (if R is a chiral alkyl group) or both to form the long pitch cholesteric material. The material may be dyed with any known suitable pleochroic dye to give enhanced contrast. Compounds and mixtures embodying the invention are particularly suitable in phase change devices in view of their low birefringence.

Examples of further compounds embodying the invention are as follows:

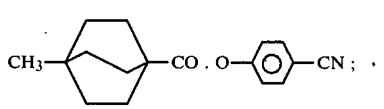

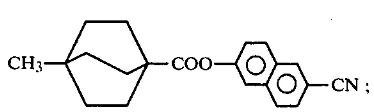

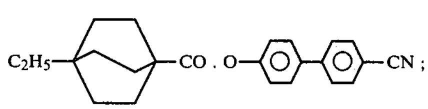

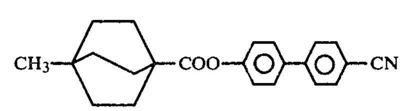

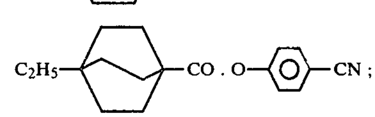

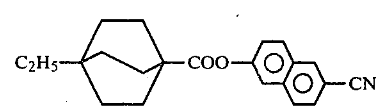

-continued
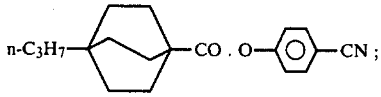
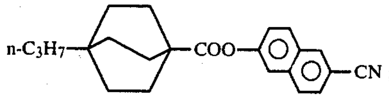
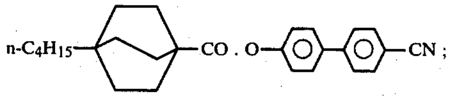
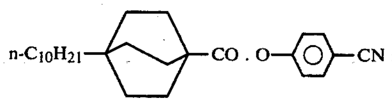
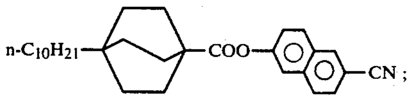
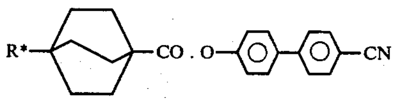
$R^* = CH_3 . CH_2CH(CH_3)CH_2$
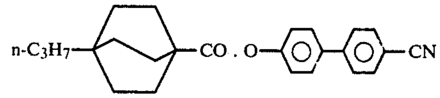
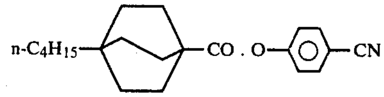
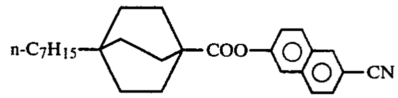
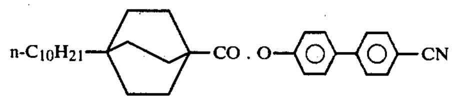
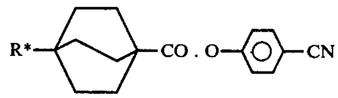
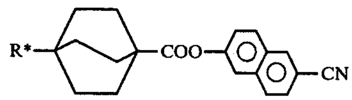
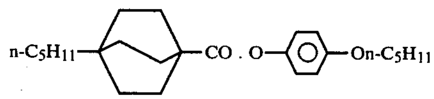
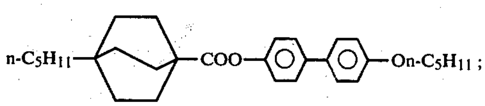
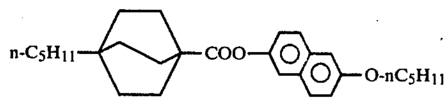
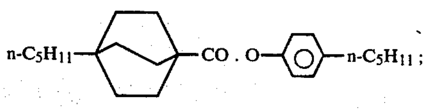
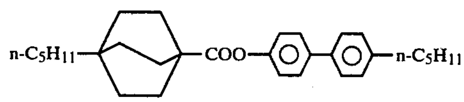
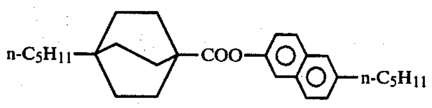
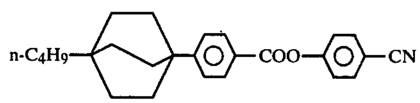
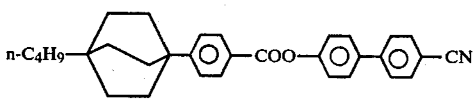
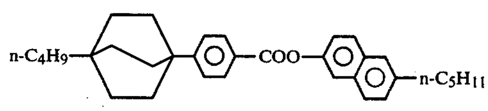
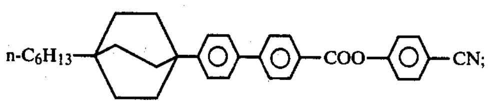
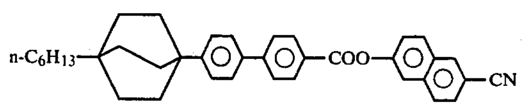
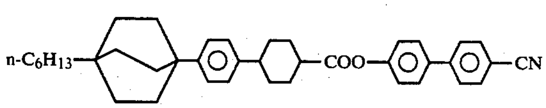
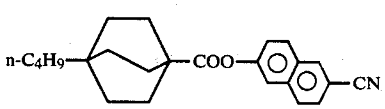 {N—I = 202° C. C—N = 108° C.;
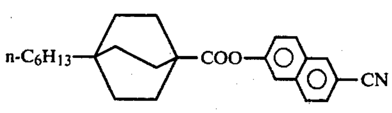 {N—I = 204° C. C—N = 98° C.;
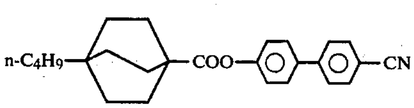 {N—I = 285° C. C—N = 143° C.;

-continued

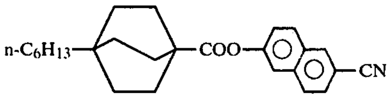

{N—I = 210° C. C—N = 134° C.;

We claim:

1. A liquid crystal compound having a molecular structure

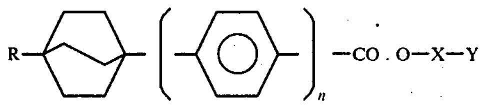

where R is an alkyl group;

is a bicyclo-[2.2.2]-octane ring; X is a 1,4 phenylene group

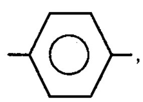

a 4,4' biphenylyl group

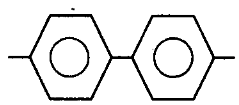

or a 2,6 naphthyl group

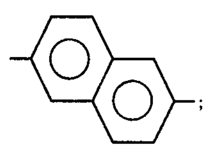

Y is a cyano group, an alkyl group or an alkoxy group; and n is 0, 1 or 2.

2. A liquid crystal compound as claimed in claim 1 and wherein n is 0, Y is CN and R is an n-alkyl group having from one to ten carbon atoms.

3. A liquid crystal compound as claimed in claim 1 and wherein n is 0, Y is CN and R is an alkyl group having from three to ten carbon atoms and containing a chiral centre.

4. A liquid crystal compound as claimed in claim 1 and wherein n is 1, Y is CN and R is an n-alkyl group having from one to ten carbon atoms.

5. A liquid crystal compound as claimed in claim 1 and wherein n is 1, Y is CN and R is an alkyl group having from three to ten carbon atoms and containing a chiral centre.

6. A liquid crystal compound as claimed in claim 1 and wherein n is 2, Y is CN and R is an n-alkyl group having from one to ten carbon atoms.

7. A liquid crystal compound as claimed in claim 1 and wherein n is 2, Y is CN and R is an alkyl group having from three to ten carbon atoms and containing a chiral centre.

8. A liquid crystal compound as claimed in claim 1 and wherein the compound is

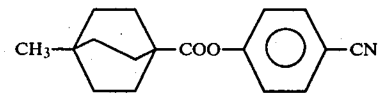

9. A liquid crystal compound as claimed in claim 1 and wherein the compound is

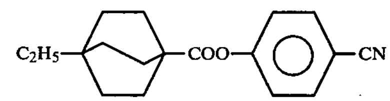

10. A liquid crystal compound as claimed in claim 1 and wherein the compound is

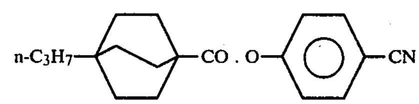

11. A liquid crystal compound as claimed in claim 1 and wherein the compound is

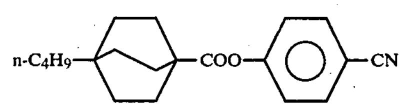

12. A liquid crystal compound as claimed in claim 1 and wherein the compound is

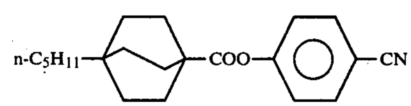

13. A liquid crystal compound as claimed in claim 1 and wherein the compound is

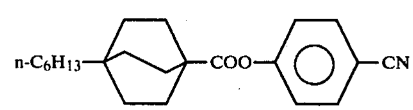

14. A liquid crystal compound as claimed in claim 1 and wherein the compound is

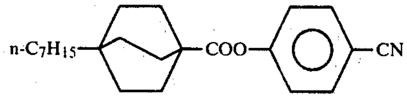

15. A liquid crystal compound as claimed in claim 1 and wherein the compound is

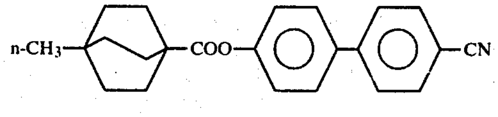

16. A liquid crystal compound as claimed in claim 1 and wherein the compound is

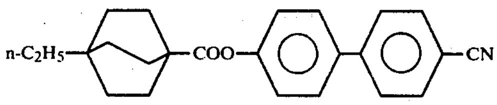

17. A liquid crystal compound as claimed in claim 1 and wherein the compound is

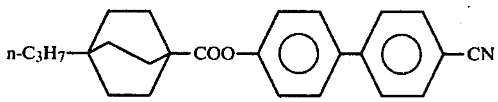

18. A liquid crystal compound as claimed in claim 1 and wherein the compound is

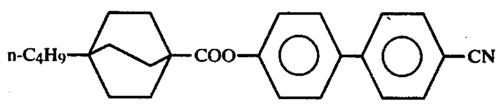

19. A liquid crystal compound as claimed in claim 1 and wherein the compound is

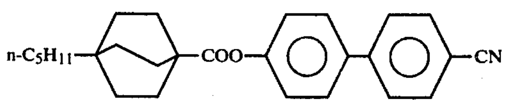

20. A liquid crystal compound as claimed in claim 1 and wherein the compound is

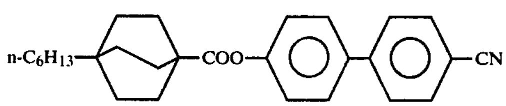

21. A liquid crystal compound as claimed in claim 1 and wherein the compound is

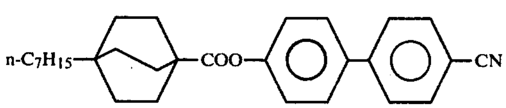

22. A liquid crystal compound as claimed in claim 1 and wherein the compound is

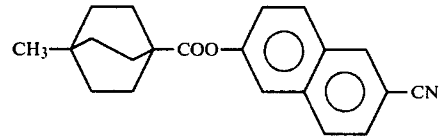

23. A liquid crystal compound as claimed in claim 1 and wherein the compound is

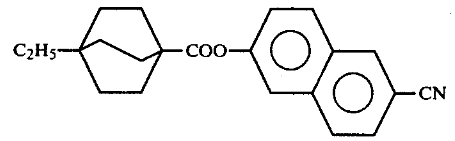

24. A liquid crystal compound as claimed in claim 1 and wherein the compound is

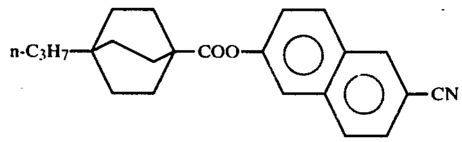

25. A liquid crystal compound as claimed in claim 1 and wherein the compound is

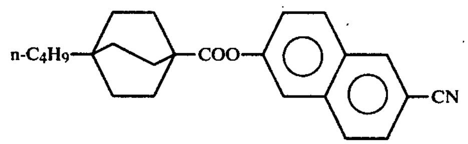

26. A liquid crystal compound as claimed in claim 1 and wherein the compound is

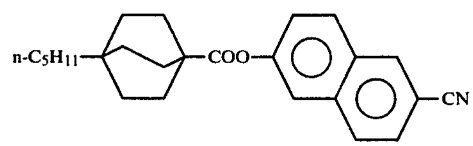

27. A liquid crystal compound as claimed in claim 1 and wherein the compound is

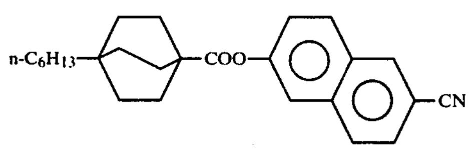

28. A liquid crystal compound as claimed in claim 1 and wherein the compound is

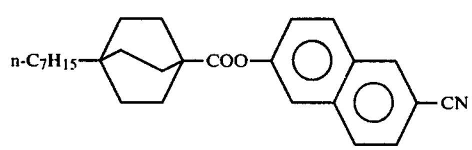

29. A liquid crystal compound as claimed in claim 1 and wherein the compound is

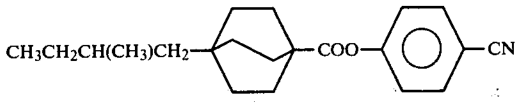

30. A liquid crystal material comprising a mixture of compounds at least one of which is a compound as claimed in claim 1.

31. A liquid crystal material comprising a mixture of compounds wherein the mixture includes at least two compounds as claimed in claim 1.

32. A liquid crystal material as claimed in claim 30 and wherein the mixture includes also at least one compound of the form

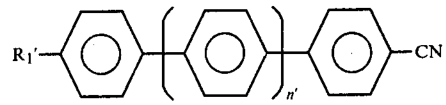

where $R'_1$ is an alkyl or alkoxy group, $n'=0$ or 1.

33. A liquid crystal electro-optic device comprising two adjacent dielectric substrates at least one of which is optically transparent, a layer of liquid crystal material between the substrates and electrodes on the inner surfaces of the substrates to allow an electric field to be applied across the material, characterised in that the liquid crystal material comprises at least one compound as claimed in claim 1.

34. A device as claimed in claim 33 and wherein the device is a twisted nematic effect device.

35. A device as claimed in claim 33 and wherein the device is a cholesteric-to-nematic phase change effect device.

* * * * *

UNITED STATES PATENT AND TRADEMARK OFFICE
CERTIFICATE OF CORRECTION

PATENT NO. : 4,261,652

DATED : April 14, 1981

INVENTOR(S) : George W. GRAY, et al

It is certified that error appears in the above-identified patent and that said Letters Patent are hereby corrected as shown below:

Column 13, 12th formula, reading

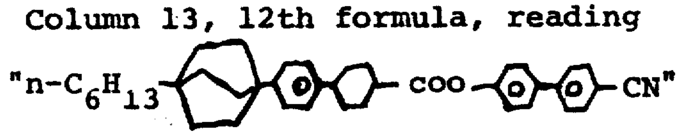

should read

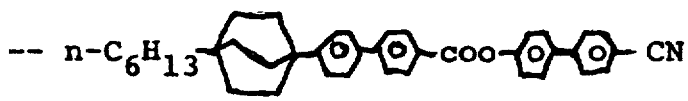

--.

Signed and Sealed this

*Sixteenth* Day of *February 1982*

[SEAL]

*Attest:*

GERALD J. MOSSINGHOFF

*Attesting Officer* *Commissioner of Patents and Trademarks*